(12) United States Patent
Su

(10) Patent No.: US 8,397,098 B2
(45) Date of Patent: Mar. 12, 2013

(54) METHOD FOR COUNTERVAILING CLOCK SKEW AND CORE LOGIC CIRCUIT USING THE SAME

(75) Inventor: Paul Su, Taipei (TW)

(73) Assignee: Via Technologies, Inc., Taipei (TW)

( * ) Notice: Subject to any disclaimer, the term of this patent is extended or adjusted under 35 U.S.C. 154(b) by 910 days.

(21) Appl. No.: 11/923,192

(22) Filed: Oct. 24, 2007

(65) Prior Publication Data

US 2008/0118017 A1    May 22, 2008

(30) Foreign Application Priority Data

Nov. 21, 2006    (TW) ................................ 95143103 A

(51) Int. Cl.
*G06F 1/12*    (2006.01)
*G06F 11/00*    (2006.01)
*H03D 13/00*    (2006.01)

(52) U.S. Cl. ........ 713/503; 713/400; 713/401; 713/500; 713/501; 713/502; 713/600; 713/601; 375/365; 375/375; 375/376

(58) Field of Classification Search .......... 713/400–401, 713/500–503, 600–601; 375/355, 375, 376
See application file for complete search history.

(56) References Cited

U.S. PATENT DOCUMENTS

| | | | |
|---|---|---|---|
| 5,467,040 A | 11/1995 | Nelson et al. | |
| 5,742,798 A | 4/1998 | Goldrian | |
| 6,374,361 B1 | 4/2002 | Lee et al. | |
| 6,449,728 B1* | 9/2002 | Bailey | 713/503 |
| 7,315,791 B2* | 1/2008 | Ilic et al. | 702/125 |
| 2002/0199124 A1* | 12/2002 | Adkisson | 713/400 |
| 2004/0027166 A1* | 2/2004 | Mangum et al. | 326/93 |
| 2005/0268139 A1* | 12/2005 | Chen | 713/500 |
| 2005/0270893 A1* | 12/2005 | Lin et al. | 365/233 |

* cited by examiner

*Primary Examiner* — Fahmida Rahman
(74) *Attorney, Agent, or Firm* — Kirton McConkie; Evan R. Witt

(57) ABSTRACT

A method for countervailing clock skew between a first clock signal and a second clock signal in a core logic circuit. The second clock signal is sampled based on the first clock signal in a sampling cycle to obtain a sampling result. When the sampling result indicates a non-compliant pattern, the phase of at least one of the first clock signal and the second clock signal is adjusted. Desirably, the core logic circuit keeps on working with the current first and second clock signals while continuing the sampling procedure of the second clock signal based on the first clock signal when the sampling result indicates a compliant pattern.

14 Claims, 12 Drawing Sheets

| Sampling code | Description |
|---|---|
| 010 | Clock skew safe with tolerance less than T2/6 |
| 110 | |
| 011 | Lead or Lag little with tolerance between T2/6 and T2/3 |
| 100 | |
| 001 | Lead or Lag more with tolerance between T2/3 and T2/2 |
| 101 | |
| 111 | Don't care |
| 000 | |

FIG.6

| Sampling code | Description |
|---|---|
| 0100 | Clock skew safe with tolerance less than T2/6 |
| 1101 | |
| 0110 | Lead or Lag little with tolerance between T2/6 and T2/3 |
| 1001 | |
| 0010 | Lead or Lag more with tolerance between T2/3 and T2/2 |
| 1011 | |
| Others | Don't care |

FIG.8

METHOD FOR COUNTERVAILING CLOCK SKEW AND CORE LOGIC CIRCUIT USING THE SAME

FIELD OF THE INVENTION

The present invention relates to a method for countervailing clock skew, and more particularly to a method for countervailing clock skew occurring in a core logic circuit of a computer system. The present invention also relates to a core logic circuit using this method to countervail clock skew.

BACKGROUND OF THE INVENTION

A motherboard of a computer system or a notebook computer is generally provided with a central processing unit (CPU), a chipset and some peripheral circuits. The CPU is the core component of a computer system for processing and controlling operations and cooperation of all the other components in the computer system as well as implementing logic computation. The chipset may be in various forms but generally includes a north bridge chip and a south bridge chip, which are used to control communication between the CPU and the peripheral circuits. In general, the north bridge chip serves for the communication with the high-speed buses at a data transmission rate from 2 GBps (billions of bits per second) to 5 GBps. Whereas, the south bridge chip serves for the communication with low-speed I/O buses and BIOS at a data transmission rate from 10 MBps (megabits per second) to 1 GBps.

FIG. 1 is a schematic functional block diagram illustrating some devices disposed on or coupled to a motherboard 1. On the motherboard 1, a central processing unit (CPU) 11 is employed for processing and controlling operations and cooperation of all the other components in the computer system as well as implementing logic computation. A chipset 12 including a north bridge chip 121 and a south bridge chip 122 is electrically connected to the CPU 11 via a front side bus (FSB) 101. A main memory 13 and an accelerated graphics port (AGP) interface 14 are electrically connected to the north bridge chip 121 via a memory bus 102 and an AGP bus 103, respectively. A peripheral component interconnect (PCI) interface 15 is electrically connected to the south bridge chip 122 via a PCI bus 104. In addition, an industry standard architecture (ISA) interface 16, a universal serial bus (USB) interface 17, an integrated device electronics (IDE) interface 18, an external keyboard device 19 and an external mouse device 20, which operate at a relatively low speed, are electrically connected to the south bridge chip 122. Additionally, the advanced motherboard 1 further includes a serial advanced technology attachment (SATA) interface which is electrically connected to the south bridge chip 122.

In the above architecture, the central processing unit (CPU) works with the chipset including the north bridge chip and the south bridge chip to maintain normal operations of the computer system. In addition, peripheral devices such as liquid crystal displays, optical drives, hard disk drives, floppy disk drives, keyboards, mice, etc. are under the control of the CPU through diverse interfaces. Thus CPU plays a very important role in the computer system. Typically, MIPS (Million Instructions Per Second) and MHz (Mega Hertz) are common measures of a CPU's speed. The former indicates the number of millions of instructions executable by the CPU per second, and the latter indicates the number of millions of oscillation performed by the CPU per second. During the operations of the CPU, a clock generator, e.g. a quartz oscillator disposed on the motherboard, continuously generates a clock signal for the reference of the CPU to precisely execute the millions of instructions in each second. The precision, however, may be adversely affected if the clock signal suffers from skew due to factors like capacitance loading, temperature variations, circuitry layout, etc. on the motherboard.

Likewise, clock skew resulting from factors like capacitance loading, temperature variations, circuitry layout, etc. on the motherboard may also adversely affect the operations of the chipset. Significant clock skew may even disorder the computer system from normal work, e.g. failure in booting or sudden breakdown of the computer system. Moreover, the clock signals provided by the clock generator for the south bridge chip and the north bridge chip are different in frequencies but are supposed to have a certain correlation in phase difference. Once there is serious clock skew existing in the north bridge chip and the south bridge chip, the above-mentioned problems may occur.

SUMMARY OF THE INVENTION

The present invention provides a method for countervailing clock skew occurring in a core logic circuit so as to avoid the above mentioned problems.

The present invention also provides a core logic circuit capable of countervailing clock skew between clock signals used therein.

In accordance with an aspect of the present invention, there is provide a method for countervailing clock skew between a first clock signal and a second clock signal in a core logic circuit. In the method, the second clock signal is sampled based on the first clock signal in a sampling cycle to obtain a sampling result. When the sampling result indicates a non-compliant pattern, the phase of at least one of the first clock signal and the second clock signal is adjusted. Desirably, the core logic circuit keeps on working with the current first and second clock signals while continuing the sampling procedure of the second clock signal based on the first clock signal when the sampling result indicates a compliant pattern.

In accordance with an aspect of the present invention, there is provide a core logic circuit includes a first chip operating with a first clock signal, and a second chip electrically connected to the first chip and operating with a second clock signal. The core logic circuit further includes a clock signal adjusting unit electrically connected to the first chip and the second chip in parallel for sampling the second clock signal based on the first clock signal to obtain a sampling result. When the sampling result indicates a non-compliant pattern, the clock signal adjusting unit enters an adjusting state to adjust the phase of at least one of the first clock signal and the second clock signal. On the other hand, when the sampling result indicates a compliant pattern, the clock signal adjusting unit enters an operating and monitoring state that allows the core logic circuit to work with the current first and second clock signals while continuing the sampling procedure of the second clock signal based on the first clock signal.

BRIEF DESCRIPTION OF THE DRAWINGS

The above contents of the present invention will become more readily apparent to those ordinarily skilled in the art after reviewing the following detailed description and accompanying drawings, in which:

FIG. 6 is a table exemplifying 3-bit sampled codes;

FIG. 8 is a table exemplifying 4-bit sampled codes.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
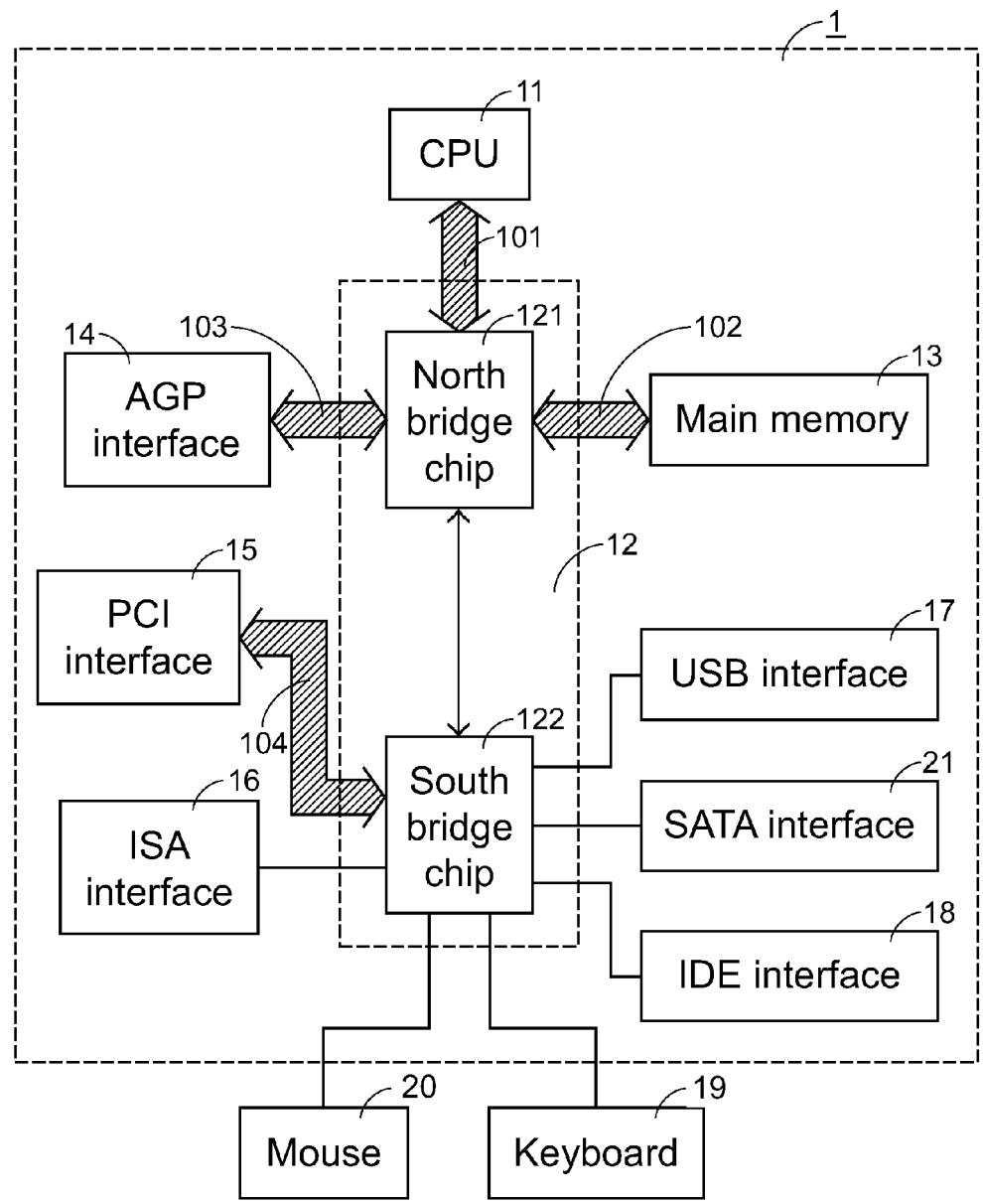
FIG. 1 is a schematic block diagram of a motherboard.
Figure 2:
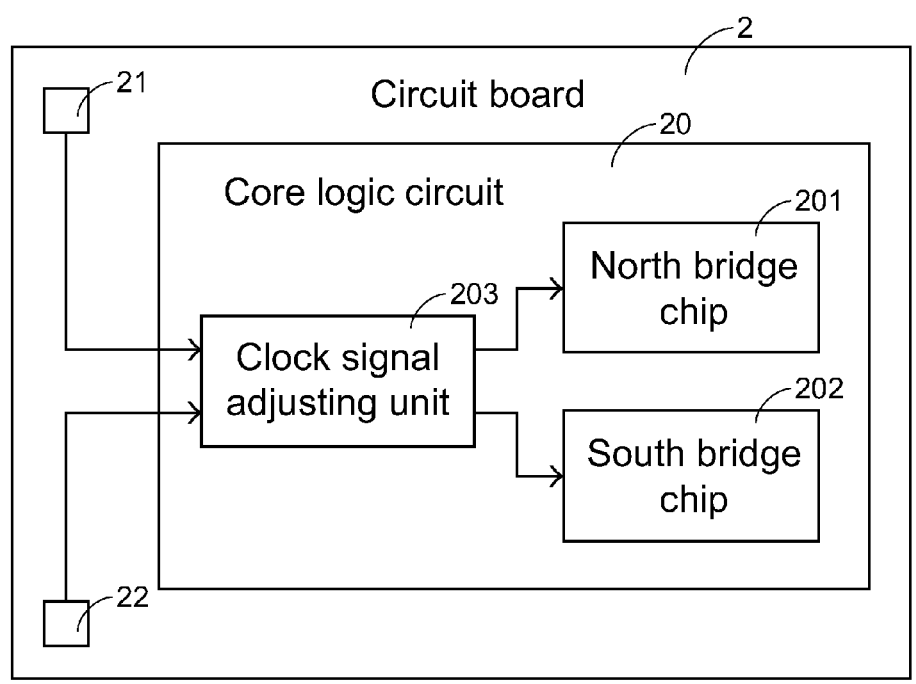
FIG. 2 is a schematic block diagram illustrating a core logic circuit according to an embodiment of the present invention disposed on a motherboard.
Figure 3:
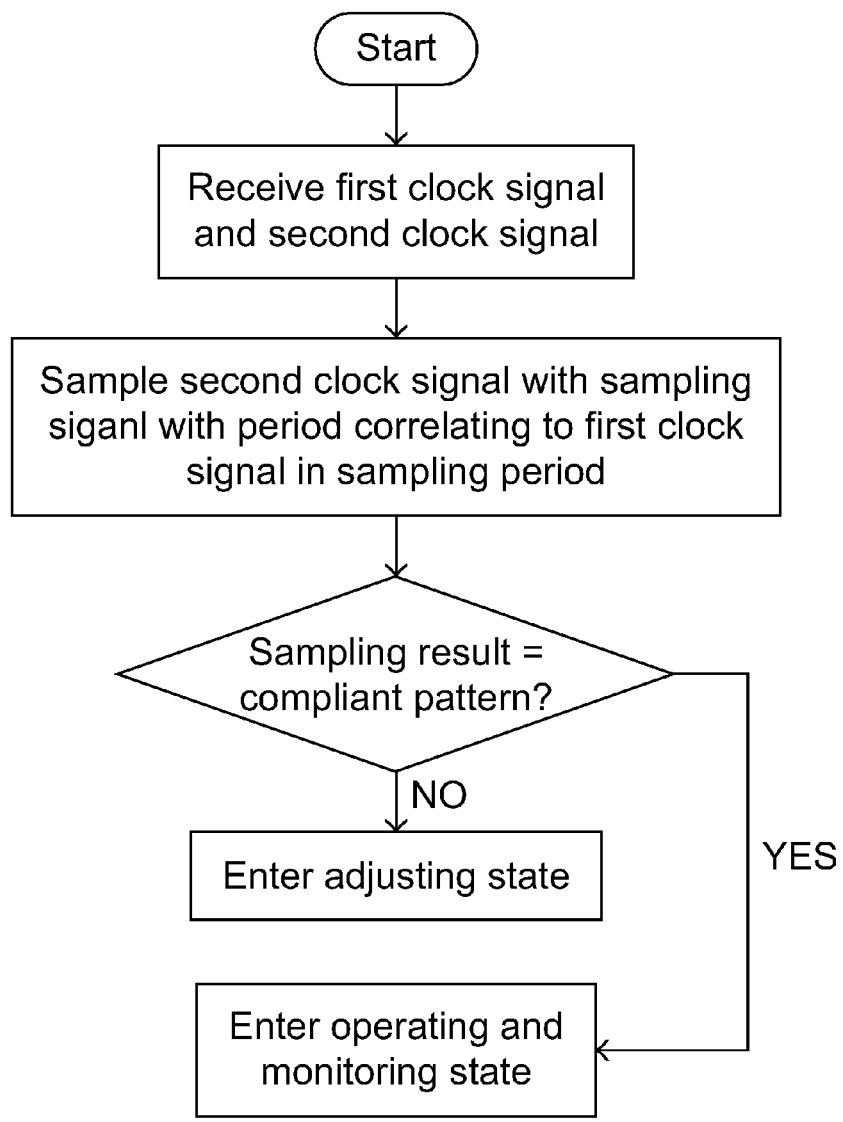
FIG. 3 is a flowchart illustrating a method for countervailing clock skew according to an embodiment of the present invention.

Referring to FIG. 2, a schematic block diagram of a core logic circuit 20 disposed on a motherboard 2 according to an embodiment of the present invention is illustrated. In this embodiment, a first clock signal 21 with a first frequency and a second clock signal 22 with a second frequency are simultaneously used by the core logic circuit 20. Assume that the first frequency is greater than the second frequency. Conventionally, the first clock signal 21 and the second clock signal 22 are independently provided to a north bridge chip 201 and a south bridge chip 202 of the core logic circuit 20. When clock skew occurs, the phases of the two clock signals 21 and 22 might become misaligned with each other. Therefore, according to the present invention, a clock signal adjusting unit 203 is additionally provided in the core logic circuit 20 to adjust relative phases of the clock signals 21 and 22 before they are used by the north bridge chip 201 and south bridge chip 202, thereby countervailing clock skew. The adjustment of the clock signals 21 and 22 by the clock signal adjusting unit 203 will be described in brief hereinafter with reference to the flowchart of FIG. 3.

After the core logic circuit 20 receives the first clock signal 21 and the second clock signal 22, the second clock signal 22 is sampled with a sampling signal with a specific period correlating to the first clock signal 21 in order to realize the phase relationship between the two clock signals 21 and 22. Accordingly, the core logic circuit can determine whether the phases of the two clock signals comply with a desired correlation or not. If the sampling result indicates a non-compliant pattern, the clock signal adjusting unit 203 enters an adjusting state of either of the first and second clock signals in order to recover the desired phase relationship between the first clock signal 21 and the second clock signal 22. On the other hand, if the sampling results in a compliant pattern, the clock signal adjusting unit 203 enters an operating and monitoring state that allows the north bridge chip 201 and the south bridge chip 202 to work with the current clock signals while continuing the sampling procedure.

Figure 4:
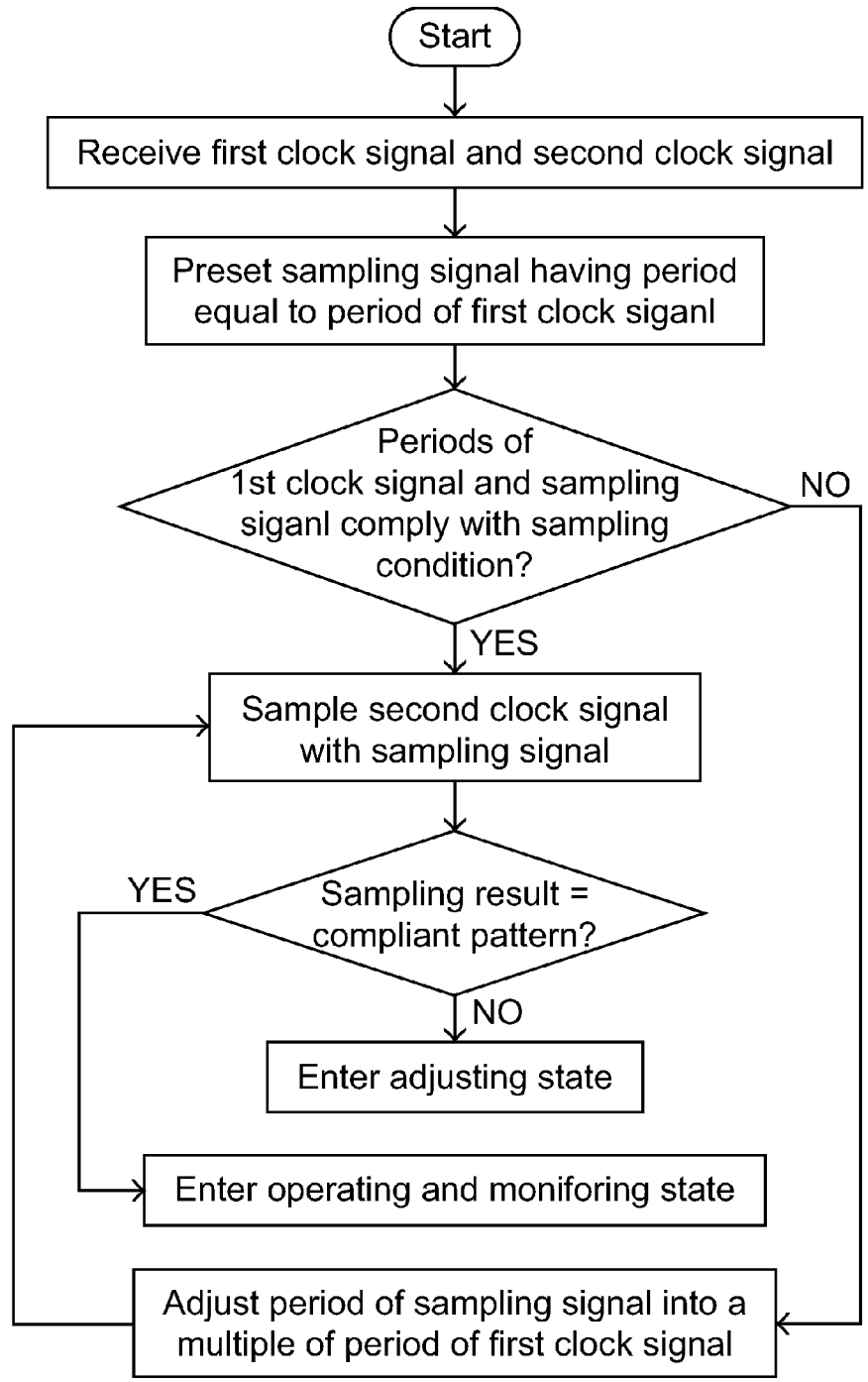
FIG. 4 is a flowchart illustrating a method for countervailing clock skew according to another embodiment of the present invention.

FIG. 4 is a flowchart of a clock adjusting method according to another embodiment of the present invention. Like the above embodiment, the core logic circuit receives a higher-frequency clock signal (e.g. the first clock signal) and a lower-frequency clock signal (e.g. the second clock signal) which are to be detected and optionally adjusted by a clock signal adjusting unit before being used by the north bridge chip and the south bridge chip. This embodiment further detects in advance whether a feasible sampling condition is satisfied before the sampling operation is performed. First of all, a signal having a period equal to the period of the first clock signal is preset as the sampling signal. Then the period of the sampling signal is compared with the period of the second clock signal to determine if the sampling condition is complied with. If the sampling condition is satisfied, the sampling signal with the period substantially equal to the period of the first clock signal is used to sample the second clock signal. Otherwise, the period of the sampling signal should be increased to a multiple of the period of the first clock signal until the sampling condition is satisfied.

Examples of the sampling condition and compliant and non-compliant patterns of the sampling results according to the present invention are described hereinafter with reference to the timing diagrams of FIGS. 5 and 7 and summarized in the tables of FIGS. 6 and 8. FIGS. 5 and 7 respectively illustrate six kinds of phase relationships between the first and second clock signals, wherein a three-bit code is used to indicate the sampling result in FIGS. 5A~5F while a four-bit code is used to indicate the sampling result in FIGS. 7A~7F.

Please refer to the examples of FIGS. 5A~5F. In these examples, a three-bit code is to be used to indicate the sampling result. Accordingly, that the period of the first clock signal (the sampling signal) 31 is greater than a half of the period of the second clock signal 32 is set as the sampling condition. Since the period of the first clock signal 31 in these examples is (⅔) the period of the second clock signal 32, which satisfies the sampling condition, a signal having a period equal to the period of the first clock signal 31 is used as the sampling signal. Desirably, the sampling signal is identical to the first clock signal. For simplifying the drawings, the clock signal 31 as shown is interpreted as both of the first clock signal and sampling clock signal. The second clock signal 32 is sampled in response to the rising edges and falling edges of the sampling clock signal 31 within each sampling period 30 at an interval 300. A sampling enable signal 33 has a period equal to the interval 300 and a high-level duration equal to the period 30 is used for triggering the sampling operations. As shown, each sampling cycle starts with a rising edge of the sampling enable signal 33 and each sampling operation starts with a rising edge of the sampling enable signal 33 and ends with a falling edge of the sampling enable signal 33. It is to be noted that the sampling period 30 is greater than a half of the second clock signal 32, and the interval 300 is a common multiple of the periods of the sampling signal 31 and second clock signal 32. In this example, the sampling period 30 is equal to the period of the first clock signal 31, which is ⅔ the period of the second clock signal 32, and the interval 300 is six times of the period of the first clock signal 31 and four times of the second clock signal 32. A code 301 is realized in each sampling operation period 30.

Figure 5A:
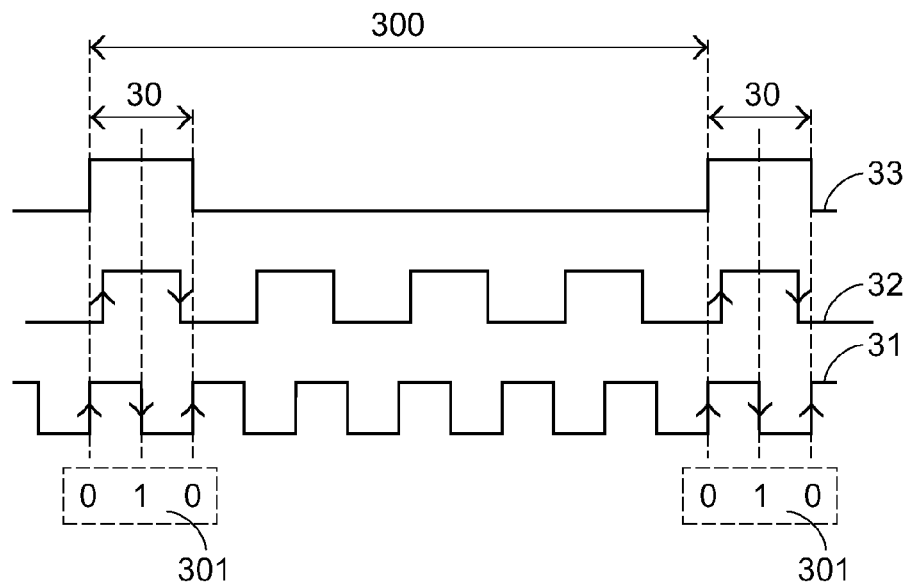
FIGS. 5A~5F are timing waveform diagrams of signals associated with the method of FIG. 4 according to a first example.

In the example of FIG. 5A, the period of the first clock signal 31 is (⅔) the period of the second clock signal 32. Therefore, the code 301 consisting of bits "010" indicates a relationship of $-(T1-T2/2) \leqq \Delta t < 0$, i.e. $-(T2/6) \leqq \Delta t < 0$, where T1 is the period of the sampling signal, T2 is the period of the second clock signal, $\Delta t$ is the phase difference between the second clock signal and the sampling signal, and the minus symbol "−" indicates the lagging of the second clock signal behind the sampling signal. In other words, the second sampling signal only slightly lags behind the sampling signal. Since the first clock signal is identical to the sampling signal, it is also indicated that the second sampling signal only slightly lags behind the first clock signal, and thus mean that the clock skew is safe for the operation of the core logic circuit.

Figure 5B:
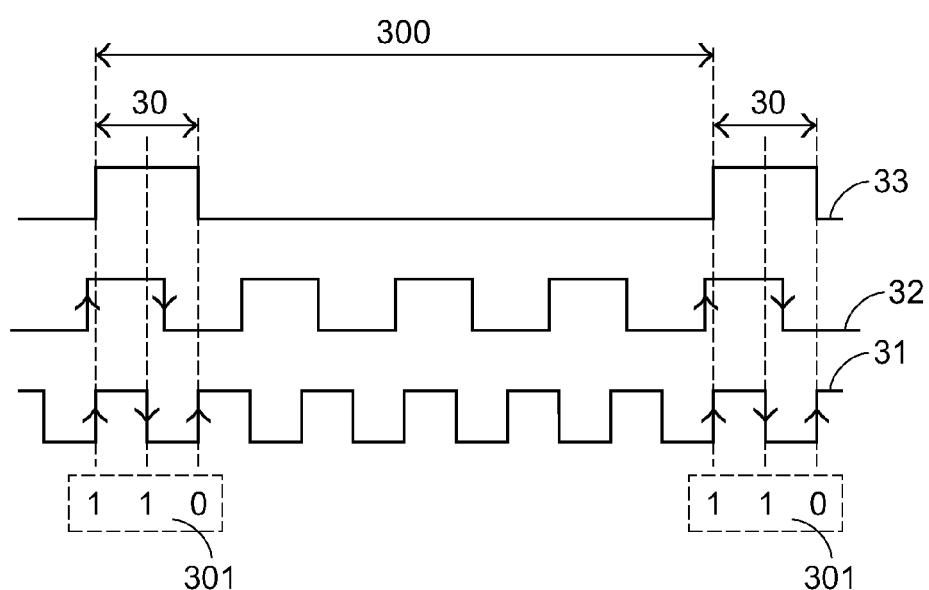

In the example of FIG. 5B, the period of the first clock signal 31 is also (⅔) the period of the second clock signal 32. Therefore, the code 301 consisting of bits "110" indicates a relationship of $0 \leq \Delta t < +(T2/2-T1/2)$, i.e. $0 \leq \Delta t < +(T2/6)$, where the plus symbol "+" indicates the leading of the second clock signal ahead the sampling signal. In other words, the second sampling signal only slightly leads the sampling signal. Since the first clock signal is identical to the sampling signal, it is also indicated that the second sampling signal only slightly leads the first clock signal, and thus mean that the clock skew is safe for the operation of the core logic circuit. Therefore, an operating and monitoring state is entered.

Figure 5C:
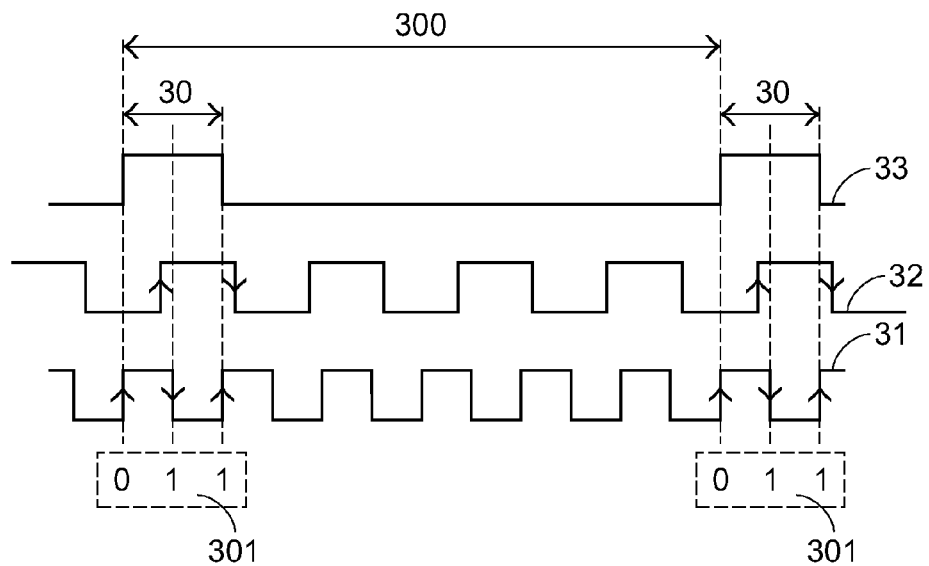

In the example of FIG. 5C, the period of the first clock signal 31 is also (⅔) the period of the second clock signal 32. Therefore, the code 301 consisting of bits "011" indicates a relationship of $-(T2/2-(T2/2-T1/2)) \leq \Delta t < -(T1-T2/2)$, i.e. $-(T2/3) \leq \Delta t < -(T2/6)$. In other words, the second sampling signal lags behind the sampling signal to a level greater than the case of FIG. 5A. Since the first clock signal is identical to the sampling signal, it is also indicated that the second sampling signal lags behind the first clock signal to the level. Such a clock skew level is a little bit concerned but temporarily no problem for the operation of the core logic circuit. Therefore, it may be adjusted or ignored, depending on individual designs. Herein, it is determined that there is no need adjusting the clock signals, and instead, an operating and monitoring state is entered.

Figure 5D:
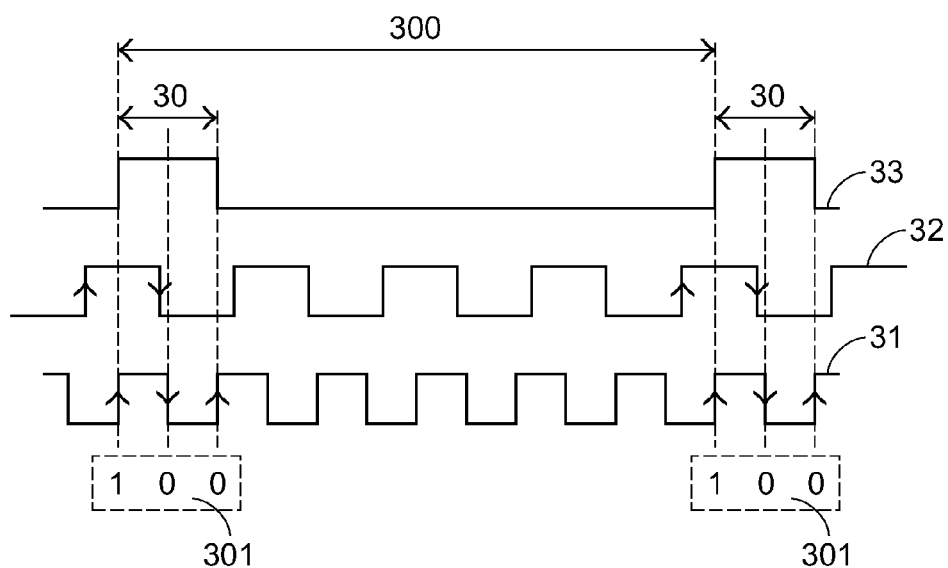

In the example of FIG. 5D, the period of the first clock signal 31 is also (⅔) the period of the second clock signal 32. Therefore, the code 301 consisting of bits "100" indicates a relationship of $+(T2/2-T1/2) \leq \Delta t < +(T2-T1)$, i.e. $+(T2/6) \leq \Delta t < +(T2/3)$. In other words, the second sampling signal leads the sampling signal to a level greater than the case of FIG. 5B. Since the first clock signal is identical to the sampling signal, it is also indicated that the second sampling signal leads the first clock signal to the level. Such a clock skew level is a little bit concerned but temporarily no problem for the operation of the core logic circuit. Therefore, it may be adjusted or ignored, depending on individual designs. Herein, it is determined that there is no need adjusting the clock signals, and instead, an operating and monitoring state is entered.

Figure 5E:
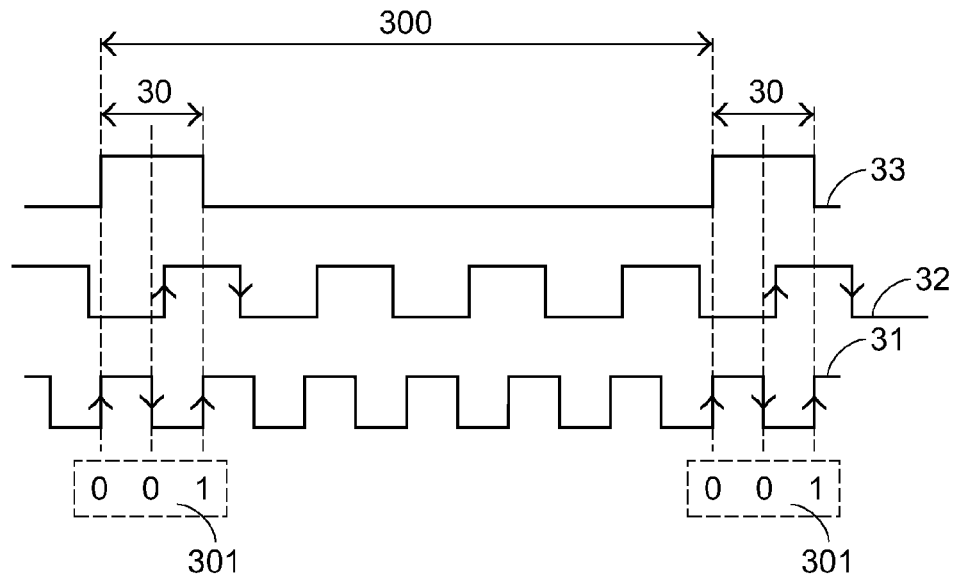

In the example of FIG. 5E, the period of the first clock signal 31 is also (⅔) the period of the second clock signal 32. Therefore, the code 301 consisting of bits "001" indicates a relationship of $-(T2/2) \leq \Delta t < -(T1/2)$, i.e. $-(T2/2) \leq \Delta t < -(T2/3)$. In other words, the second sampling signal lags behind the sampling signal to a level hard to be ignored. Since the first clock signal is identical to the sampling signal, it is also indicated that the second sampling signal largely lags behind the first clock signal to such a level. As the clock skew may render abnormal operation of the core logic circuit, the clock signals need proper adjusting.

Figure 5F:
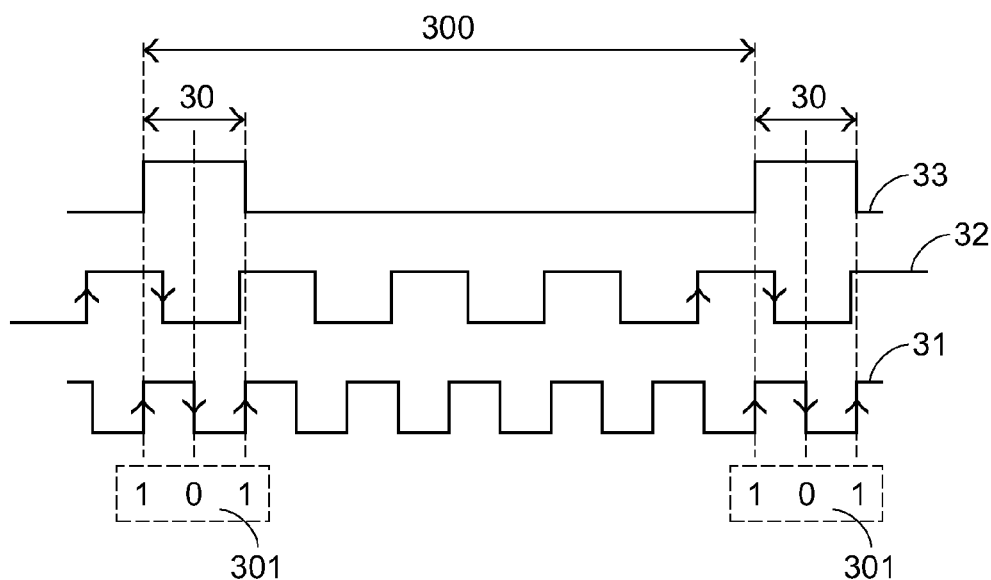

In the example of FIG. 5F, the period of the first clock signal 31 is also (⅔) the period of the second clock signal 32. Therefore, the code 301 consisting of bits "101" indicates a relationship of $+(T2-T1) \leq \Delta t < +(T2/2)$, i.e. $+(T2/3) \leq \Delta t < +(T2/2)$. In other words, the second sampling signal leads the sampling signal to a level hard to be ignored. Since the first clock signal is identical to the sampling signal, it is also indicated that the second sampling signal largely leads the first clock signal to such a level. As the clock skew may render abnormal operation of the core logic circuit, the clock signals need proper adjusting.

Various codes and their descriptions are summarized in the table of FIG. 6. By detecting the code obtained in the sampling procedure, it is easily determined whether the clock adjusting procedure is required or not.

Likewise, please refer to the examples of FIGS. 7A~7F. The period of the first clock signal 41 in these examples is (⅔) the period of the second clock signal 42. A signal having a period equal to the period of the first clock signal 41 is used as the sampling signal. Desirably, the sampling signal is identical to the first clock signal. For simplifying the drawings, the clock signal 41 as shown is interpreted as both of the first clock signal and sampling clock signal. The second clock signal 42 is sampled in response to the rising edges and falling edges of the sampling signal 41 for a period 40 at an interval 400. A sampling enable signal 43 has a period equal to the interval 400 and a high-level duration equal to the period 40 is used for triggering the sampling operations. As a 4-bit code is used to indicate the sampling result in these examples, the period 40 is set longer than the period 30 of FIGS. 5A~5F. Each sampling cycle starts with a rising edge of the sampling enable signal 43 and each sampling operation starts with a rising edge of the sampling enable signal 43 and ends with a falling edge of the sampling enable signal 43. In these examples, the interval 400 is also six times of the period of the first clock signal 41 and four times of the second clock signal 42. A 4-bit code 401 is realized in each sampling operation period 40.

Figure 7A:
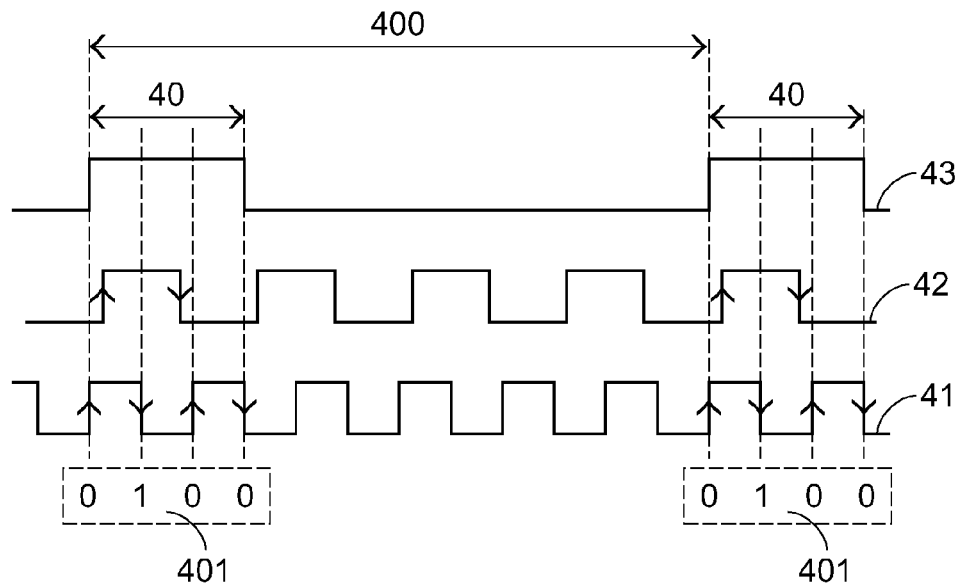
FIGS. 7A~7F are timing waveform diagrams of signals associated with the method of FIG. 4 according to a second example.

In the example of FIG. 7A, the period of the first clock signal 41 is (⅔) the period of the second clock signal 42. Therefore, the code 401 consisting of bits "0100" indicates a relationship of $-(T1-T2/2) \leq \Delta t < 0$, i.e. $-(T2/6) \leq \Delta t < 0$. In other words, the second sampling signal only slightly lags behind the sampling signal. Since the first clock signal is identical to the sampling signal, it is also indicated that the second sampling signal only slightly lags behind the first clock signal, and thus mean that the clock skew is safe for the operation of the core logic circuit.

Figure 7B:
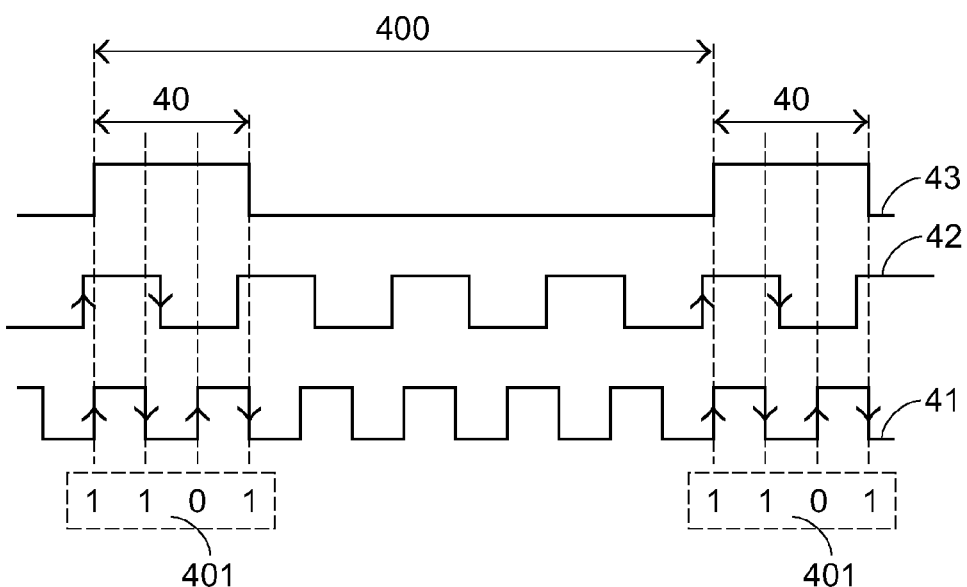

In the example of FIG. 7B, the period of the first clock signal 41 is also (⅔) the period of the second clock signal 42. Therefore, the code 401 consisting of bits "1101" indicates a relationship of $0 \leq \Delta t < +(T2/2-T1/2)$, i.e. $0 \leq \Delta t < +(T2/6)$. In other words, the second sampling signal only slightly leads the sampling signal. Since the first clock signal is identical to the sampling signal, it is also indicated that the second sampling signal only slightly leads the first clock signal, and thus mean that the clock skew is safe for the operation of the core logic circuit. Therefore, an operating and monitoring state is entered.

Figure 7C:
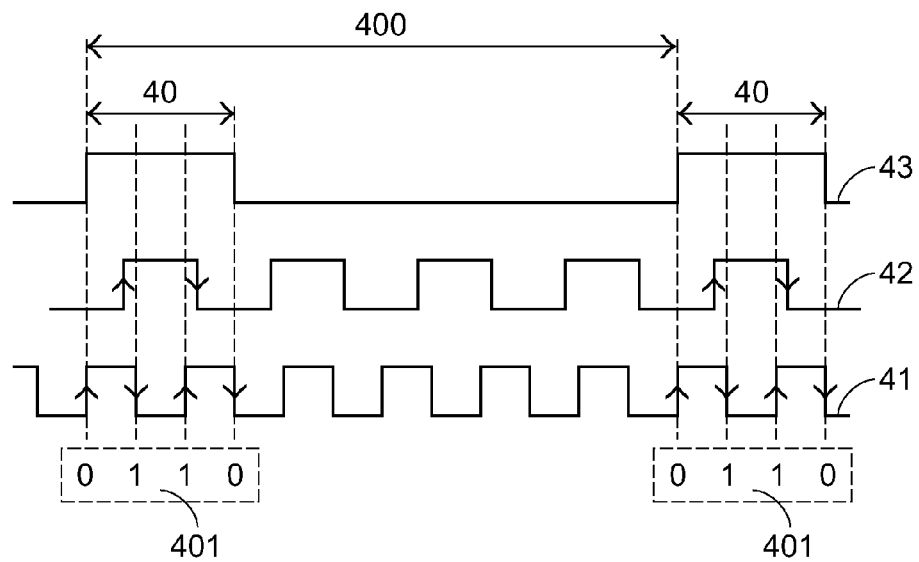

In the example of FIG. 7C, the period of the first clock signal 41 is also (⅔) the period of the second clock signal 42. Therefore, the code 401 consisting of bits "0110" indicates a relationship of $-(T1/2) \leq \Delta t < -(T1-T2/2)$, i.e. $-(T2/3) \leq \Delta t < -(T2/6)$. In other words, the second sampling signal lags behind the sampling signal to a level greater than the case of FIG. 7A. Since the first clock signal is identical to the sampling signal, it is also indicated that the second sampling signal lags behind the first clock signal to the level. Such a clock skew level is a little bit concerned but temporarily no problem for the operation of the core logic circuit. Therefore, it may be adjusted or ignored, depending on individual designs. Herein, it is determined that there is no need adjusting the clock signals, and instead, an operating and monitoring state is entered.

Figure 7D:
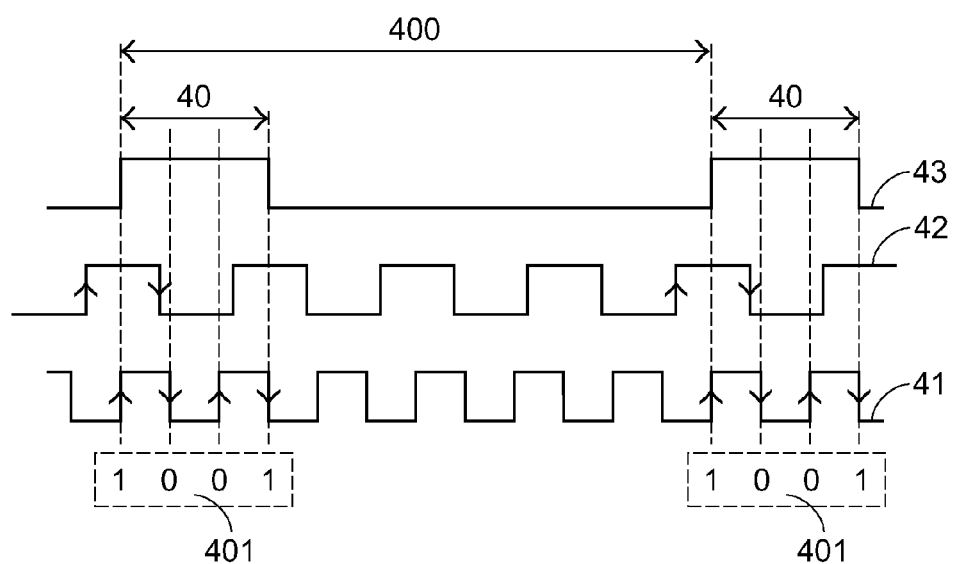

In the example of FIG. 7D, the period of the first clock signal 41 is also (⅔) the period of the second clock signal 42. Therefore, the code 401 consisting of bits "1001" indicates a relationship of $+(T2/2-T1/2) \leq \Delta t < +(T2-T1)$, i.e. $+(T2/6)$ $\leq \Delta t < +(T2/3)$. In other words, the second sampling signal leads the sampling signal to a level greater than the case of FIG. 7B. Since the first clock signal is identical to the sampling signal, it is also indicated that the second sampling signal leads the first clock signal to the level. Such a clock skew level is a little bit concerned but temporarily no problem for the operation of the core logic circuit. Therefore, it may be adjusted or ignored, depending on individual designs. Herein, it is determined that there is no need adjusting the clock signals, and instead, an operating and monitoring state is entered.

Figure 7E:
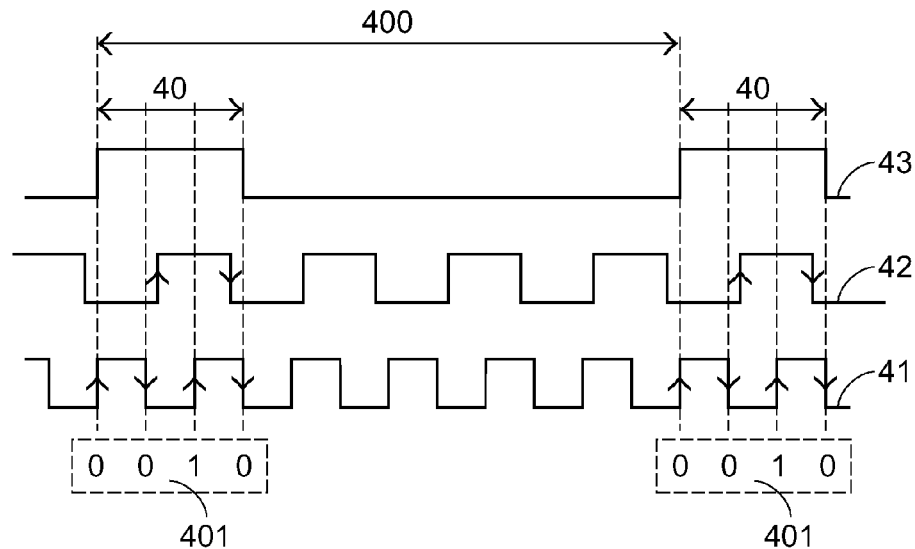

In the example of FIG. 7E, the period of the first clock signal 41 is also (⅔) the period of the second clock signal 42. Therefore, the code 401 consisting of bits "0010" indicates a relationship of $-(3T1/2-T2/2) \leq \Delta t < -(T1/2)$, i.e. $-(T2/2) \leq \Delta t < -T2/3$). In other words, the second sampling signal lags behind the sampling signal to a level hard to be ignored. Since the first clock signal is identical to the sampling signal, it is also indicated that the second sampling signal largely lags behind the first clock signal to such a level. As the clock skew may render abnormal operation of the core logic circuit, the clock signals need proper adjusting.

Figure 7F:
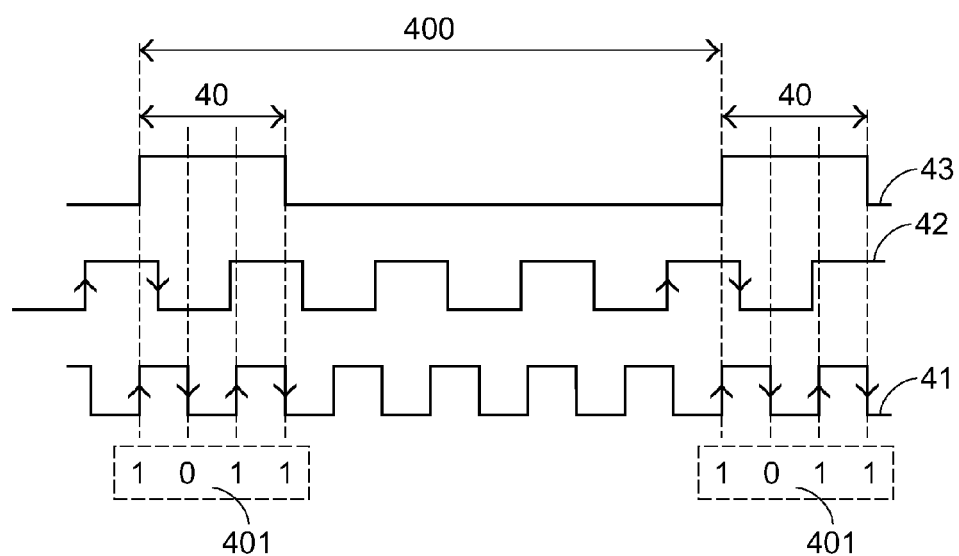

In the example of FIG. 7F, the period of the first clock signal 41 is also (⅔) the period of the second clock signal 42. Therefore, the code 401 consisting of bits "1011" indicates a relationship of $+(T2-T1) \leq \Delta t < +(T2/2)$, i.e. $+(T2/3) \leq \Delta t < +(T2/2)$. In other words, the second sampling signal leads the sampling signal to a level hard to be ignored. Since the first clock signal is identical to the sampling signal, it is also indicated that the second sampling signal largely leads the first clock signal to such a level. As the clock skew may render abnormal operation of the core logic circuit, the clock signals need proper adjusting.

Various codes and their descriptions are summarized in the table of FIG. 8. By detecting the code obtained in the sampling procedure, it is easily determined whether the clock adjusting procedure is required or not.

According to the sampled codes, either the adjusting state or operating and monitoring state is entered. The verified or adjusted clock signals are then sent to the north bridge chip and south bridge chip to assure of normal work of the core logic circuit.

From the above descriptions, it is understood that clock skew can be easily countervailed by adjusting phases of clock signals, e.g. lagging one of the clock signals. The clock adjusting method according to the present invention is particularly essential to a core logic circuit involving different clock signals to avoid erroneous data access or breakdown of the computer system.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for countervailing clock skew between a first clock signal and a second clock signal in a core logic circuit, comprising steps of:
    sampling the second clock signal by a sampling signal in a sampling cycle to obtain a sampling result directly; and
    adjusting the phase of at least one of the first clock signal and the second clock signal according to the sampling result if the sampling result indicates a non-compliant pattern;
    wherein a frequency of the first clock signal is greater than that of the second clock signal, and the sampling signal has a period equal to that of the first clock signal when a first condition is satisfied, and the sampling signal being a multiple of that of the first clock signal when the first condition is not satisfied,
    wherein the first condition is that the first clock signal has a period greater than a half of the period of the second clock signal.

2. The method according to claim 1 wherein the second clock signal is sampled in response to rising edges and falling edges of the sampling signal within a sampling period so as to obtain the sampling result as a multi-bit code.

3. The method according to claim 2 wherein the multi-bit code include three bits or four bits.

4. The method according to claim 2 wherein the sampling period is greater than a half of a period of the second clock signal.

5. The method according to claim 1 wherein the length of the sampling cycle is a common multiple of periods of the sampling signal and the second clock signal.

6. The method according to claim 1 further comprising a step of entering an operating and monitoring state that allows the core logic circuit to work with the current first and second clock signals while continuing the sampling procedure of the second clock signal based on the first clock signal when the sampling result indicates a compliant pattern.

7. The method according to claim 1 wherein the first clock signal is provided for a north bridge chip of the core logic circuit, and the second clock signal is provided for a south bridge chip of the core logic circuit.

8. A core logic circuit comprising:
    a first chip operating with a first clock signal;
    a second chip electrically connected to the first chip and operating with a second clock signal; and
    a clock signal adjusting unit electrically connected to the first chip and the second chip in parallel for sampling the second clock signal by a sampling signal to obtain a sampling result directly, wherein the clock signal adjusting unit enters an adjusting state to adjust the phase of at least one of the first clock signal and the second clock signal according to the sampling result when the sampling result indicates a non-compliant pattern;
    wherein a frequency of the first clock signal is greater than that of the second clock signal, and the sampling signal has a period equal to that of the first clock signal when a first condition is satisfied, and the sampling signal being multiple of that of the first clock signal when the first condition is not satisfied,
    wherein the second clock signal is sampled in response to rising edges and falling edges of the sampling signal having the period correlating to the period of the first clock signal within a sampling period so as to obtain the sampling result as a multi-bit code.

9. The core logic circuit according to claim 8 wherein the sampling period is greater than a half of a period of the second clock signal.

10. The core logic circuit according to claim 8 wherein the period of the sampling signal is equal to that of the first clock signal or is a multiple of that of the first clock signal.

11. The core logic circuit according to claim 10 wherein the second clock signal is sampled by the sampling signal in a sample cycle to obtain the sampling result, and the length of the sampling cycle is a common multiple of periods of the sampling signal and the second clock signal.

12. The core logic circuit according to claim 8 wherein the first condition is that the first clock signal has a period greater than a half of the period of the second clock signal.

13. The core logic circuit according to claim 8 wherein the clock signal adjusting unit enters an operating and monitoring state that allows the core logic circuit to work with the current first and second clock signals while continuing the sampling procedure of the second clock signal based on the first clock signal when the sampling result indicates a compliant pattern.

14. The core logic circuit according to claim 8 wherein the first chip is a north bridge chip, and the second chip is a south bridge chip.

* * * * *